(12) United States Patent
Peck et al.

(10) Patent No.: US 6,987,257 B2
(45) Date of Patent: Jan. 17, 2006

(54) ATTITUDE DETERMINATION SYSTEM AND METHOD

(75) Inventors: Mason A. Peck, Scottsdale, AZ (US); Leah R. Soffer, Cherry Hill, NJ (US)

(73) Assignee: Honeywell International Inc., Morristown, NJ (US)

( * ) Notice: Subject to any disclaimer, the term of this patent is extended or adjusted under 35 U.S.C. 154(b) by 318 days.

(21) Appl. No.: 10/353,674

(22) Filed: Jan. 28, 2003

(65) Prior Publication Data

US 2004/0144910 A1    Jul. 29, 2004

(51) Int. Cl.
*G01C 21/24*    (2006.01)
(52) U.S. Cl. .............................. 250/206.2; 356/139.03; 244/171; 702/153
(58) Field of Classification Search .. 250/206.1–206.2; 356/138, 139.01, 139.03, 147, 148; 244/3.15, 244/3.16, 171; 702/150–153
See application file for complete search history.

(56) References Cited

U.S. PATENT DOCUMENTS 4,769,531 A * 9/1988 Malek ..................... 250/206.2
5,393,970 A * 2/1995 Shau et al. ............... 250/206.2
6,597,443 B2 * 7/2003 Boman ................... 356/139.03
6,757,068 B2 * 6/2004 Foxlin ........................ 356/620

FOREIGN PATENT DOCUMENTS

EP          0930512 A1    7/1999
WO    WO 02/39062 A1 *   5/2002

* cited by examiner

*Primary Examiner*—David Porta
*Assistant Examiner*—Stephen Yam

(57) ABSTRACT

An attitude determination system and method is provided that includes at least two sensor sets. Each sensor set is configured to detect electromagnetic radiation, such as light of a known frequency. Specifically, each sensor set is configured to detect electromagnetic radiation from a one of a plurality of point sources, where each of the plurality of point sources emits electromagnetic radiation of a different frequency. Each sensor set includes at least three sensors, with each of the three sensors having a different orientation. The three sensors in the sensor set are used to determine a relative orientation of the vehicle with respect to one of the point sources. The at least two sensor sets in the system determine the relative orientation with respect to at least two point sources. By placing the sensors on a vehicle and knowing the direction to the point sources in a reference frame coordinate system, the orientation of the vehicle with respect to this reference frame can be estimated.

20 Claims, 4 Drawing Sheets

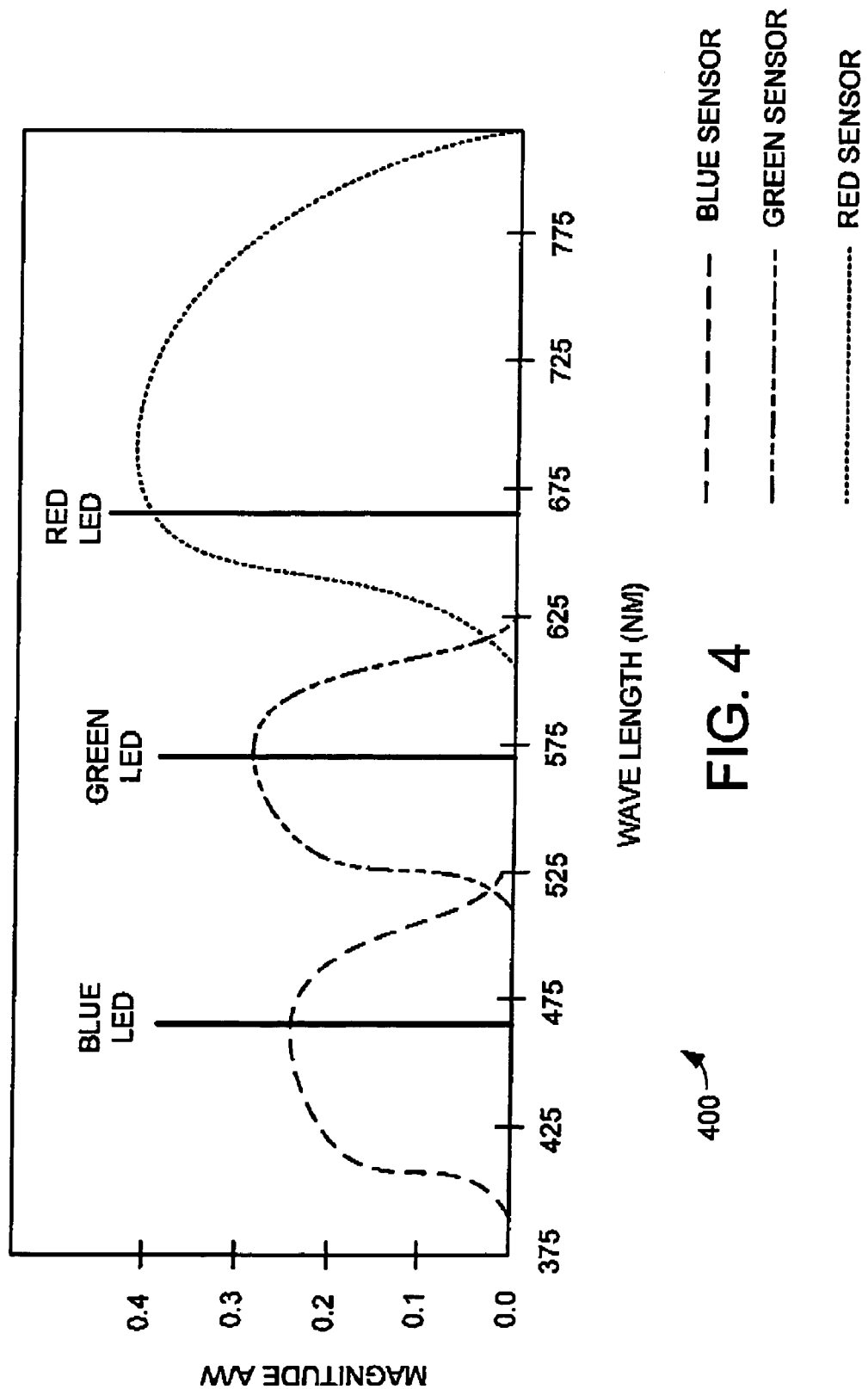

US 6,987,257 B2

ATTITUDE DETERMINATION SYSTEM AND METHOD

FIELD OF THE INVENTION

This invention generally relates to attitude sensors, and more specifically applies to attitude sensor systems for satellite systems, satellite simulators, and related aerospace vehicles.

BACKGROUND OF THE INVENTION

The term attitude refers to the angular orientation of one coordinate system with respect to another. There are many practical reasons for determining attitude. For example, if one coordinate system is associated with an aerospace vehicle, and the other with some earth- or inertial-reference coordinates, this orientation can be used for the vehicle's guidance and flight control.

Attitude sensors are systems that are designed gather data used to determine the angular orientation of a vehicle such as a satellite. For spacecraft, attitude sensors detect (among other things) the limb of the earth, the location of the sun, the direction of Earth's magnetic field, and the direction of various stars. Global Positioning Systems have also been used for this purpose. Once the data is gathered, it is included with the known position and/or direction of these references in a relevant coordinate system and used in some sort of numerical algorithm that extracts a mathematical representation of the spacecraft's attitude. The most convenient form of attitude data is a collection of reference vectors—unit vectors in the direction of a known object or known objects. Since the 1960s, solutions to the problem of optimal attitude determination using many such measurements have been known, and data in this form is readily adapted to these classical algorithms.

One common type of attitude sensor used in satellite applications is the star tracker. A star tracker captures an image of stars that lie within its field of view. A computer resolves the location of each star as a unit vector from this focal-plane information, and these unit vectors are then combined to provide an attitude estimate. In general, the more data the better. Sun sensors measure only a single vector (the direction of the sun) but star trackers measure many more. Thus, star trackers can provide a more complete and accurate means of attitude determination.

One drawback to the use of star trackers is their complexity. Star trackers typically require significant computational power and an accurate, lengthy digital star catalog. The resulting system is expensive, complex, heavy and slow because a typical star tracker relies upon a large array of CCD elements from which digital images of the star clusters are captured. These digital images are then compared to star clusters in the digital star catalog. The processing power used to compare star clusters to the star catalog is significant, as it requires sophisticated pattern-recognition techniques.

All of these features make star trackers an expensive and sometimes problematic solution to attitude determination. Therefore, what is a needed is an attitude sensor system that avoids the complexity and costs of previous systems to provide a cost-effective means to determine vehicle orientation for systems such as ground-test facilitates, or satellite simulators, where incorporating a star tracker is too costly, or less practical than the alternatives.

BRIEF SUMMARY OF THE INVENTION

The present invention provides an attitude determination system that overcomes the limitations of the prior art. The attitude determination system includes at least two sensor sets. Each sensor set is configured to detect electromagnetic radiation of a known frequency. Specifically, each sensor set is configured to detect electromagnetic radiation from a one of a plurality of point sources, where each of the plurality of point sources emits electromagnetic radiation of a different frequency.

Each sensor set includes at least three sensors, with each of the three sensors having a different orientation. The three sensors in the sensor set are used to determine a relative orientation of the vehicle with respect to one of the point sources. The at least two sensor sets in the system determine the relative orientation with respect to at least two point sources.

The sensors determine the relative orientation with respect to the point sources by comparing the intensity of the detected electromagnetic wave to a maximum intensity. From the comparison, a unit vector to the point source can be calculated. From at least two unit vectors estimated in this manner, the attitude of the vehicle with respect to a reference coordinate frame can be calculated.

The attitude determination system can be implemented with relatively simple and inexpensive sensors. Additionally, because the attitude determination system requires no pattern recognition, processing complexity can be reduced and speed increased.

The foregoing and other objects, features and advantages of the invention will be apparent from the following more particular description of a preferred embodiment of the invention, as illustrated in the accompanying drawings.

BRIEF DESCRIPTION OF DRAWINGS

The preferred exemplary embodiment of the present invention will hereinafter be described in conjunction with the appended drawings, where like designations denote like elements, and:

FIG. 4 is a graph illustrating sensor detection wavelengths for three sensors.

DETAILED DESCRIPTION OF THE INVENTION

The present invention provides an attitude determination system that includes at least two sensor sets. Each sensor set is configured to detect electromagnetic radiation of a defined type. Specifically, each sensor set is configured to detect electromagnetic radiation from a one of a plurality of point sources, where each of the plurality of point sources emits electromagnetic radiation of a different frequency.

Each sensor set includes at least three sensors, with each of the three sensors having a different orientation. The three sensors in the sensor set are used to determine a relative orientation of the vehicle with respect to one of the point sources. The at least two sensor sets in the system determine the relative orientation with respect to at least two point sources. Placing the sensors on a vehicle and knowing the direction to the point sources in a reference frame coordinate system can estimate the orientation of the vehicle with respect to this reference frame.

In this application, the term attitude refers to the angular orientation of one coordinate system with respect to another. There are many practical reasons for determining attitude. For example, if one coordinate system is associated with an aerospace vehicle, and the other with some earth- or inertial-reference coordinates, this orientation can be used for the vehicle's guidance and flight control.

Attitude consists of three independent pieces of information, such as the roll, pitch, and yaw angles associated with an aircraft or spacecraft. However, many other three-parameter attitude representations have been devised (including Euler angles and Rodrigues parameters), as have redundant attitude representations (such as the four-element quaternion or Euler parameters and the nine-element direction-cosine matrix).

Attitude can be represented via any of these parameterizations, although some have advantages over others; but regardless of how attitude is represented, it includes at its core three independent mathematical degrees of freedom. Although a unit vector is normally thought of as something with three independent scalar components, it includes only two unique pieces of information. The three scalars are constrained by the requirement that the magnitude (or norm) equal 1. For example, a unit vector can be defined via azimuth and elevation angles or right-ascension and declination angles.

If only unit vectors were available for attitude determination, a single vector would be insufficient to supply the needed three parameters described above. Specifically, rotation about that single vector would be unspecified. Using two unit vectors is overkill, in a sense, because doing so would provide four pieces of information. Nevertheless, two unit vectors can be sufficient for determining a complete three-axis attitude as long as they are linearly independent (that is, as long as they are not parallel or antiparallel).

Figure 1:
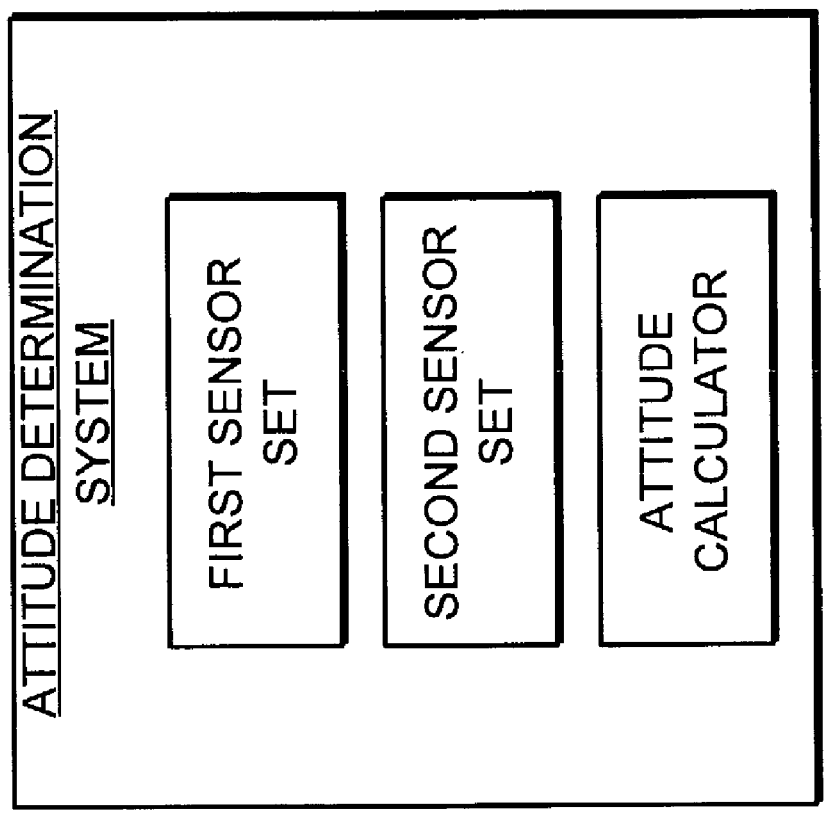
FIG. 1 is a schematic view a attitude determination system.

Turning now to FIG. 1, an exemplary attitude determination system 100 is schematically illustrated. The attitude determination system 100 includes two sensor sets and an attitude calculator. Of course, additional sensor sets can be added for improved accuracy and/or reliability. Each sensor set is configured to detect electromagnetic radiation of a defined type. Specifically, each sensor set is configured to detect electromagnetic radiation from a one of a plurality of point sources.

For example, where the plurality of point sources each emit electromagnetic radiation having different frequency components, each sensor set can be configured to detect electromagnetic radiation in a particular frequency band that corresponds uniquely to one of the plurality of point sources. In this way, the each sensor set can be configured to sense only one of the plurality of point sources, and substantially ignore electromagnetic radiation from other sources.

Each sensor set includes at least three sensors, with each of the three sensors having a different orientation. Each of the three sensors has a different orientation in that the sensitive surfaces of the sensors are arranged to be in different planes. As such, electromagnetic radiation from the corresponding point source strikes each sensor in the set at a different incidence angle. By measuring the intensity of the electromagnetic wave striking all three sensors, the directional vector to the point source of the electromagnetic radiation can be determined. By using the first and second sensor sets to determine directional vectors to two point sources, the overall attitude of the vehicle can be determined by the attitude calculator.

In the preferred embodiment, each sensor determines its relative orientation with respect to its corresponding point source by comparing the intensity of the detected electromagnetic wave to a maximum intensity. The maximum intensity occurs when the sensitive surface of the sensor is perpendicular to a directional vector pointing at the corresponding point source. When the sensitive surface is at a non-perpendicular angle, the sensor captures only a portion of the maximum intensity. The intensity portion captured is thus proportional to the cosine or the incidence angle on the sensitive surface. By determining the proportion captured at each of the three sensors, the direction of the vector pointing to the point source can be determined. By determining two vectors pointing to two point sources, the attitude determination system can quickly and accurately determine the attitude of the vehicle.

Figure 2:
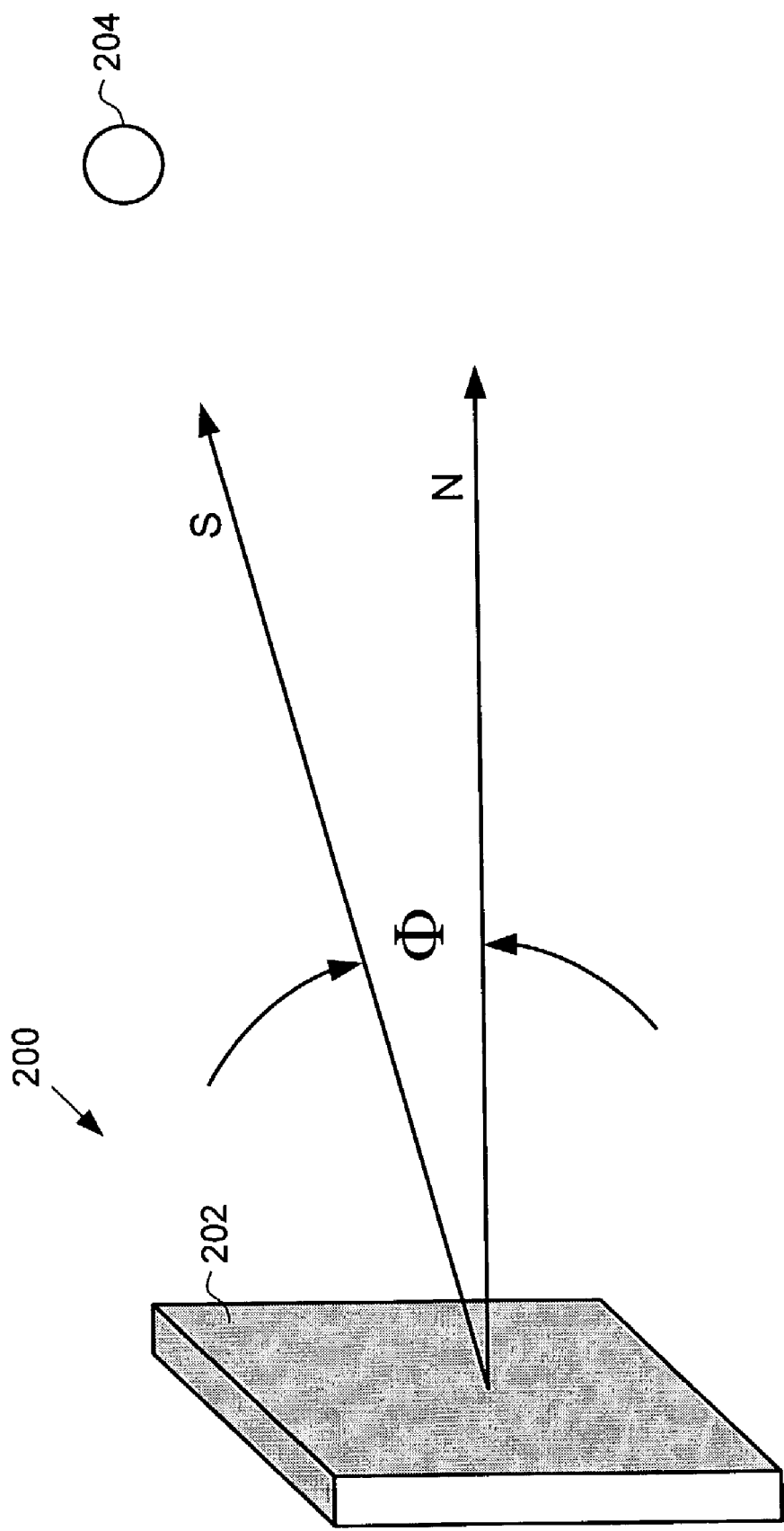
FIG. 2 is schematic view a sensor implementation.

Turning now to FIG. 2, and exemplary sensor 200 is illustrated. The exemplary sensor 200 can be any suitable sensor capable of detecting electromagnetic radiation. The sensor 200 has a sensitive surface 202, where the sensitive surface 202 is the surface that measures the electromagnetic radiation. The orientation of the sensitive surface can be described by a vector normal to the sensitive surface. In FIG. 2, the vector N comprises a vector that is normal to the sensitive surface 202.

FIG. 2 also illustrations a point source 204. The point source 204 provides the electromagnetic radiation that is detected by the sensor 200. As such, the sensor 200 should be configured to primarily respond to electromagnetic radiation from the point source 204, and to substantially ignore electromagnetic radiation from other sources. This can be done by choosing a sensor 200 that responds only to the wavelengths emitted by point source 204, while not responding to wavelengths of other point sources.

The point source 204 provides electromagnetic radiation that is detected by the sensor 200. The intensity of the radiation detected can be used to determine the incidence angle of radiation and the sensor 200. In FIG. 2, the vector S comprises a vector from the sensor surface 202 to the point source 204. The angle between the point source vector S and the sensitive-surface normal unit vector N is labeled $\Phi$. The angle $\Phi$ can be defined as:

$$\Phi = \cos^{-1}(N^T S) \qquad \text{Equation 1}$$

Where $N^T$ is a transposed sensitive surface vector and the S is the point source vector. Thus, the angle is the arccosine of the vector product between the transposed sensitive surface vector and the point source vector. Furthermore, because the intensity of the detected electromagnetic radiation is proportional to angle of incidence, the angle $\Phi$ can be defined as:

$$\Phi = \cos^{-1}\left(\frac{A}{A_{\max}}\right) \qquad \text{Equation 2}$$

Where A is detected electromagnetic radiation intensity and $A_{max}$ is the maximum detected intensity that occurs when the sensitive surface normal is pointed directly at the point source 204. Thus, the angle $\Phi$ can be quickly determined with a simple measurement of the intensity and a comparison to the maximum intensity. Any non-linearity that occurs at large angles of incidence can be calibrated out. It should be noted that this angle is determined essentially by hardware, without requiring extensive software calculations.

Figure 3:
FIG. 3 is a schematic view of a sensor set implementation.
Figure 3:
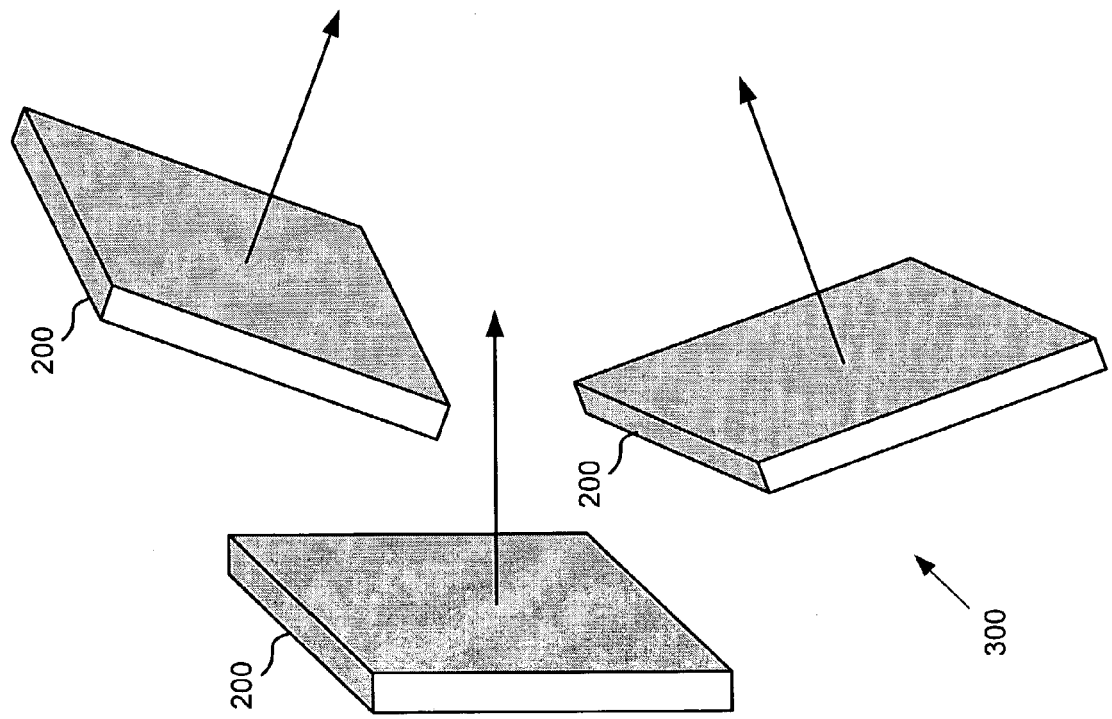

Each sensor set includes at least three sensors, with each of the three sensors having a different orientation. Each of the three sensors has a different orientation in that the sensitive surfaces of the sensors are arranged to be in different planes. Turning now to FIG. 3, a sensor set 300 is illustrated that includes three sensors 200, with each of the sensors having a different orientation.

With each sensor measuring intensity, the vector S to the point source from the sensor set can be calculated as:

$$S = \begin{bmatrix} N_1^T/A_{max,1} \\ N_2^T/A_{max,2} \\ N_3^T/A_{max,3} \end{bmatrix}^{-1} \begin{bmatrix} A_1 \\ A_2 \\ A_3 \end{bmatrix} \qquad \text{Equation 3}$$

Where $A_{max1}$, $A_{max2}$, and $A_{max3}$ are the maximum intensity of each of the three sensors, $A_1$, $A_2$, and $A_3$ are the measured intensities for each of the three sensors, and $N_1^T$, $N_2^T$, and $N_3^T$ are transposed sensitive surface vectors for each of the three sensors. Although the point source is the same for each sensor, small manufacturing-related differences among the sensors may cause them to measure slightly different values of intensity even when S is parallel to N, and for this reason $A_{max}$ is preferably calibrated for each of the sensors. Equation 3 calculates the vector S from a simple 3×3 matrix inverse. If more than three sensor sets are used, a least squares optimal solution can be used, as shown in Equation 4, where the superscript '+' indicates the pseudo-inverse of a nonsquare matrix.

$$S = \begin{bmatrix} N_1^T/A_{max,1} \\ N_2^T/A_{max,2} \\ \vdots \\ N_n^T/A_{max,n} \end{bmatrix}^{+} \begin{bmatrix} A_1 \\ A_2 \\ \vdots \\ A_n \end{bmatrix} \qquad \text{Equation 4}$$

It should be noted that the accuracy of this approach assumes that the point source 204 is far enough from the three sensors so that S is the essentially the same as seen from each sensor. If the geometry of the problem violates this assumption, more care must be taken in computing S. In summary, by measuring the intensity of the electromagnetic radiation striking all three sensors, the directional vector S to the point source of the electromagnetic radiation can be determined By using the first and second sensor sets to determine directional vectors to two point sources, the overall attitude of the vehicle can be determined by the attitude calculator. Additional sensor sets can be used to add additional accuracy. The calculation can be done using any of a variety of known methods.

For example, Markley's SVD algorithm can be used for a complete three-parameter attitude estimate if at least two vector measurements ($S_1$, $S_2$, ..., $S_n$) are available. In this solution, let ($T_1$, $T_2$, ..., $T_n$) be the known directions of the corresponding light sources in the reference coordinate system of interest. First, a 3×3 matrix summation of outer produces B is determined, where B is defined as:

$$B = \sum_{i=1}^{n} T_i S_i^T \qquad \text{Equation 5}$$

Then, a singular-value decomposition provides U, X, and V such that:

$$UXV^T = B \qquad \text{Equation 6}$$

Finally, the optimal attitude (represented as a direction-cosine matrix Q) is defined as:

$$Q = U \text{diag}(1\ 1\ \det(U)\det(V)) V^T \qquad \text{Equation 7}$$

Again, this is just one example of the type of methods that can be used to determine the attitude of the vehicle. Other known methods, such as QUEST, ESOQ, FOAM, Davenport's q method, and the Euler-q method can be used with identically accurate results once the vectors to multiple points sources ($S_1$, $S_2$, ..., $S_n$) are known.

A wide variety of devices can be used to implement the sensor sets. In particular, any device that measures radiation intensity as a function of incidence angle can be used. As one example, photodiode can be used to measure electromagnetic radiation intensity in a defined frequency. Photodiodes output a voltage or current that is proportional to intensity received, and is thus proportional to the cosine of the incidence angle. Photodiodes have the advantage of being relatively in expensive and available in many different configurations. Furthermore, photodiodes are available with different wavelength sensitivities, with these different photodiodes designed to capture electromagnetic radiation in different frequency bands.

In this example, one sensor set can comprise three photodiodes that are sensitive to only a defined band of light, with additional sensor sets comprising other photodiodes that are sensitive to other defined bands. Turning now to FIG. 4, a graph 400 illustrates the sensitivity of a "blue" photodiode sensor, a "green" photodiode sensor, and a "red" photodiode sensor. As illustrated in graph 400, each of the photodiodes is sensitive to light within a relatively narrow band, with limited overlap between. This allows the photodiodes to measure the intensity of light within their respective band while substantially not responding to other light sources.

When photodiodes are used as a sensor, the point sources can be implemented with a corresponding light source. For example, a blue, green and red LED can be used to provide point sources of electromagnetic radiation. LEDs have the advantage of providing a relatively narrow band of light. As such, the light from one LED will not be registered by the "other color" photodiode sensors. For example, chart 400 shows that the blue LED provides a point source within the blue sensor sensitivity band. Light from the blue LED will be measured by the blue photodiode, but not affect other photodiodes. Likewise, light from the green LED will be measured by the green photodiode, but not affect other photodiodes. Finally, light from the red LED will be measured by the red photodiode, but will not affect other photodiodes. Thus, each sensor set can be made sensitive only to the spectral band associated with a single point source, while not substantially responding to the other point sources.

Thus, a sensor set can be made with at least three photodiodes of one color, and the point sources provided by corresponding LEDs that provide light of that color. Using this implementation, multiple sensor sets and multiple point sources provided with a relatively low cost.

Photosensors represent just one example of the type of devices that can be used. Other narrow-band electromagnetic sensors can be used to detect the radiation. Other examples of sensors include polarized RF antennas, infrared (heat) and ultraviolet sensors, to name a few.

It should be noted that the embodiments of the invention can be applied to testing environments such as a test bed for satellites, or to actual operational satellite systems. In test bed environments, the point sources can be supplied and implemented as part of the test bed system. In this application, point sources such as the colored LEDs discussed above are particularly desirable. In operational satellite systems, the point sources used for attitude determination are limited to those available to the spacecraft. For example, stars and other celestial bodies having known electromagnetic spectra can be used at point sources. In general, any electromagnetic source with a known vector within a reference coordinate system can be used.

In testing applications, any point source that provides distinct electromagnetic radiation can be used, such as the LEDs discussed above. Other examples of point sources include RF signals at various frequencies and at distinct polarizations, infrared (heat) sources, and ultraviolet sources. Generally, it is desirable that the point sources provide a spherical source of radiation. As such, the radiation measured by the sensors is substantially effected only by the attitude of the vehicle. Also, it is generally desirable to use point sources that are separated from one another in an angular sense, such that their directional vectors are linearly independent.

As stated above, each sensor set includes at least three sensors, with each of the three sensors having a different orientation. Each of the three sensors has a different orientation in that the vector normal to each sensor's sensitive surface is linearly independent from that of any other sensor in the set. Nearly parallel normal vectors result in a sensor set with a wide field of view, but one in which the signal-to-noise ration is low; increasing the angular separation among the surface normals reduces the field of view but improves accuracy. At one extreme, three exactly parallel sensors could sense a light source anywhere within a 180° arc, but this configuration violates the requirement that the at least three sensors in a set be linearly independent. So, it would not uniquely determine a three-axis attitude. At the other extreme, sensors with widely separated surface normals (nearly antiparallel) detect position accurately but offer a limited field of view within which all sensors see the point source. Thus, it is generally desirable to select an arrangement of sensitive surfaces that balances the need for accuracy with the need for a wide field of view.

It should also be noted that while the invention requires at least two sensor sets to determine attitude, additional sensor sets and/or additional sensors within each set can be added to improve accuracy and provide redundancy. As stated above, each sensor set includes at least three sensors, with each of the three sensors having a different orientation. Each of the three sensors has a different orientation in that the sensitive surfaces of the sensors are arranged to be in different planes. A least-squares or other optimal solution can be found for the multiple-sensor and multiple-set cases.

The present invention thus provides an attitude determination system that includes at least two sensor sets. Each sensor set is configured to detect electromagnetic radiation, such as light of a known frequency. Specifically, each sensor set is configured to detect electromagnetic radiation from a one of a plurality of point sources, where each of the plurality of point sources emits electromagnetic radiation of a different frequency. Each sensor set includes at least three sensors, with each of the three sensors having a different orientation. The three sensors in the sensor set are used to determine a relative orientation of the vehicle with respect to one of the point sources. The at least two sensor sets in the system determine the relative orientation with respect to at least two point sources. By placing the sensors on a vehicle and knowing the direction to the point sources in a reference frame coordinate system, the orientation of the vehicle with respect to this reference frame can be estimated.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

The invention claimed is:

1. An attitude determination system, the attitude determination system comprising:
   a) a first sensor set, the first sensor set including at least three sensors each having a different orientation, each of the at least three sensors receiving electromagnetic radiation from a first point source and measuring an intensity of the electromagnetic radiation from the first point source;
   b) a second sensor set, the second sensor set including at least three sensors each having a different orientation, each of the at least three sensors receiving electromagnetic radiation from a second point source and measuring an intensity of the electromagnetic radiation from the second point source; and
   c) an attitude calculator, the attitude calculator determining a first vector to the first point source based on ratios of the intensity measured bit each of the at least three sensors in the first sensor set and corresponding maximum intensities at each of the at least three sensors in the first sensor set, the attitude calculator determining a second vector to the second point source based on ratios of the intensity measured by each of the at least three sensors in the second sensor set and corresponding maximum intensities at each of the at least three sensors in the second sensor set, the attitude calculator determining an attitude using the first vector and the second vector.

2. The attitude determination system of claim 1 wherein the attitude calculator determines the first vector to the first point source and the second vector to the second point source as:

$$S = \begin{bmatrix} N_1^T / A_{max,1} \\ N_2^T / A_{max,2} \\ \vdots \\ N_n^T / A_{max,n} \end{bmatrix}^+ \begin{bmatrix} A_1 \\ A_2 \\ \vdots \\ A_n \end{bmatrix}$$

where $A_{max,1}$ is a maximum intensity of the first sensor in the first sensor set, $A_{max,2}$ is a maximum intensity of the second sensor in the first sensor set, and $A_{max,n}$ is a maximum intensity of the $n^{th}$ sensor in the first sensor set, $A_1$ is a measured intensity of the first sensor in the first sensor set, $A_2$ is a measured intensity of the second sensor in the first sensor set, and $A_n$ is a measured intensity of the $n^{th}$ sensor in the first sensor set, where $N_1^T$ comprises a transposed sensitive surface vector for the first sensor in the first sensor set, where $N_2^T$ comprises a transposed sensitive surface vector for the second sensor in the first sensor set, and where $N_n^T$ comprises a transposed sensitive surface vector for the $n^{th}$ sensor in the first sensor set.

3. The attitude determination system of claim 1 wherein the first sensor set does not substantially respond to the electromagnetic radiation from the second point source and wherein the second sensor set does not substantially respond to the electromagnetic radiation from the first point source.

4. The attitude determination system of claim 1 wherein the first sensor set comprises at least three photodiodes of a first color sensitivity and wherein the second sensor set comprises at least three photodiodes of a second color sensitivity.

5. The attitude determination system of claim 1 wherein the first point source comprises a first light of a first color, end wherein the second point source comprises a second light of a second color.

6. The attitude determination system of claim 5 wherein the first light comprises a first LED and wherein the second light comprises a second LED.

7. The attitude determination system of claim 1 wherein each of the three sensors in the first sensor set includes a sensitive surface, with each sensitive surface of the three sensors in the first sensor set having a different orientation, and wherein each of the three sensors in the second surface includes a sensitive surface, with each sensitive surface of the three sensors in the second sensor set having a different orientation.

8. The attitude determination system of claim 7 wherein each of the three sensors in the first sensor provides a voltage proportional to a corresponding angle of incidence to its sensitive surface, and wherein each of the three sensors in second sensor provides a voltage proportional to a corresponding angle of incidence to its sensitive surface.

9. The attitude determination system of claim 1 wherein the attitude determination system is part of a satellite test bed.

10. An attitude determination system, the attitude determination system comprising:

a) a first sensor set, the first sensor set including at least three sensors, the at least three sensors including a first sensor, a second sensor, and an $n^{th}$ sensor, where n is at least 3, wherein each of the at least three sensors includes a sensitive surface having a different orientation, and wherein each of the at least three sensors receives electromagnetic radiation from a first point source and provides an output proportional to an angle of incidence between the electromagnetic radiation from the first point source and its sensitive surface;

b) a second sensor set, the second sensor set including at least three sensors, the at least three sensors including a first sensor, a second sensor, and $n^{th}$ sensor, where n is at least 3, wherein each of the at least three sensors includes a sensitive surface having a different orientation, and wherein each of the at least three sensors receives electromagnetic radiation from a second point source and provides an output proportional to an angle of incidence between the electromagnetic radiation from the second point source and its sensitive surface; and c) an attitude calculator, attitude calculator determining a first vector $S_1$ to the first point source, the first vector S1 calculated as:

$$S_1 = \begin{bmatrix} N_1^T / A_{max,1} \\ N_2^T / A_{max,2} \\ \vdots \\ N_n^T / A_{max,n} \end{bmatrix}^+ \begin{bmatrix} A_1 \\ A_2 \\ \vdots \\ A_n \end{bmatrix}$$

where $A_{max,1}$ is a maximum intensity of the sensor in the first sensor set, $A_{max,2}$ is a maximum intensity of the second sensor in the first sensor set, and $A_{max,n}$ is a maximum intensity of the $n^{th}$ sensor in the first sensor set $A_1$ is the measured intensity for the first sensor in the first sensor set, $A_2$ is a measured intensity for the second sensor in the first sensor set and $A_n$ is a measured intensity for the $n^{th}$ sensor first sensor set, where $N_1^T$ comprises a transposed sensitive surface vector for a first sensor in the first sensor set, where $N_2^T$ comprises a transposed sensitive surface vector for a second sensor in the first sensor set, and where $N_n^T$ comprises a transposed sensitive surface vector for an $n^{th}$ sensor in the first sensor set, the attitude calculator further determining a second vector $S_2$ to the first point source, the second vector $S_2$ calculated as:

$$S_2 = \begin{bmatrix} N_1^T / A_{max,1} \\ N_2^T / A_{max,2} \\ \vdots \\ N_n^T / A_{max,n} \end{bmatrix}^+ \begin{bmatrix} A_1 \\ A_2 \\ \vdots \\ A_n \end{bmatrix}$$

where $A_{max,1}$ is a maximum intensity of the first sensor in the second sensor set, $A_{max,2}$ is a maximum intensity of the second sensor in the second sensor set, and $A_{max,n}$ is a maximum intensity of the $n^{th}$ sensor in the second sensor set, $A_1$ is a measured intensity for the first sensor in the second sensor set, $A_2$ is a measured intensity for the second sensor in the second sensor set, and $A_n$ is a measured intensity for the $n^{th}$ sensor second sensor set, where $N_1^T$ comprises a transposed sensitive surface vector for a first sensor in the second sensor set, where $N_2^T$ comprises a transposed sensitive surface vector for a second sensor in the second sensor set, and where $N_n^T$ comprises a transposed sensitive surface vector for an $n^{th}$ sensor in the second sensor set, and wherein the attitude calculator determines an attitude from the first vector $S_1$ and the second vector $S_2$.

11. The attitude determination system of claim 10 wherein the first sensor set does not substantially respond to the electromagnetic radiation from the second point source and wherein the second sensor set does not substantially respond to the electromagnetic radiation from the first point source.

12. The attitude determination system of claim 10 wherein the first senor set comprises at least three photodiodes of a first color sensitivity and wherein the second sensor set comprises at least three photodiodes of a second color sensitivity.

13. The attitude determination system of claim 10 wherein the first point source comprises a first light of a first color, and wherein the second point source comprises a second light of a second color.

14. The attitude determination system of claim 13 wherein the wherein the attitude determination system is part of a satellite test bed.

15. A method of determining attitude of a vehicle, the method comprising the steps of:
    a) measuring intensity of electromagnetic radiation from a first point source to a first set of three sensors, each of the first set of three sensors having a sensitive surface with a different orientation;
    b) measuring intensity of electromagnetic radiation from a second point source to a second set of three sensors, each of the second set of three sensors having a sensitive surface with a different orientation; and
    c) determining a first vector to the first point source based on ratios of the intensity measured by each of the first set of three sensors and corresponding maximum intensities at each of the first set of three sensors, determining a second vector to the second point source based on ratios of the intensity measured by each of the second set of three sensors and corresponding maximum intensities at each of the second set of three sensors, and determining an attitude using the first vector and the second vector.

16. The method of claim 15 wherein the first vector to the first point source and the second vector to the second point source are calculated as:

$$S = \begin{bmatrix} N_1^T / A_{\max,1} \\ N_2^T / A_{\max,2} \\ \vdots \\ N_n^T / A_{\max,n} \end{bmatrix}^+ \begin{bmatrix} A_1 \\ A_2 \\ \vdots \\ A_n \end{bmatrix}$$

where $A_{max,1}$ is a maximum intensity of the first sensor in the first sensor set, $A_{max,2}$ is a maximum intensity of the second sensor in the first sensor set, and $A_{max,n}$ is a maximum intensity of the $n^{th}$ sensor in the first sensor set, $A_1$ is a measured intensity of the first sensor in the first sensor set, $A_2$ is a measured intensity of the second sensor in the first sensor set, and $A_n$ is a measured intensity of the $n^{th}$ sensor in the first sensor set, where $N_1^T$ comprises a transposed sensitive surface vector for the first sensor in the first sensor set, where $N_2^T$ comprises a transposed sensitive surface vector for the second sensor in the first sensor set, and where $N_n^T$ comprises a transposed sensitive surface vector for the $n^{th}$ sensor in the first sensor set.

17. The method of claim 15 wherein the step of measuring intensity of electromagnetic radiation from a first point source to a first set of three sensors comprises providing outputs proportional to an angle of incidence between the electromagnetic radiation from the first point source and the sensitive surfaces of the first set of three sensors, and wherein the step of measuring intensity of electromagnetic radiation from a second point source to a second set of three sensors comprises providing outputs proportional to an angle of incidence between the electromagnetic radiation from the second point source and the sensitive surfaces of the second set of three sensors.

18. The method of claim 15 wherein the step of measuring intensity of electromagnetic radiation from a first point source to a first set of three sensors comprises substantially not responding to electromagnetic radiation from the second point source and wherein the step of measuring the intensity of electromagnetic radiation from the second point source to the second set of three sensors comprises substantially not responding to electromagnetic radiation from the first point source.

19. The method of claim 15 wherein the first sensor set comprises at least three photodiodes of a first color sensitivity and wherein the second sensor set comprises at least three photodiodes of a second color sensitivity.

20. The method of claim 15 wherein the first point source comprises a first LED and wherein the second point source comprises a second LED.

* * * * *